US008504490B2

(12) United States Patent
Nie et al.

(10) Patent No.: US 8,504,490 B2
(45) Date of Patent: Aug. 6, 2013

(54) WEB-SCALE ENTITY RELATIONSHIP EXTRACTION THAT EXTRACTS PATTERN(S) BASED ON AN EXTRACTED TUPLE

(75) Inventors: Zaiqing Nie, Beijing (CN); Xiaojiang Liu, Beijing (CN); Jun Zhu, Pittsburgh, PA (US); Ji-Rong Wen, Beijing (CN)

(73) Assignee: Microsoft Corporation, Armonk, NY (US)

( * ) Notice: Subject to any disclaimer, the term of this patent is extended or adjusted under 35 U.S.C. 154(b) by 490 days.

(21) Appl. No.: 12/757,722

(22) Filed: Apr. 9, 2010

(65) Prior Publication Data

US 2011/0251984 A1 Oct. 13, 2011

(51) Int. Cl.
*G06F 15/18* (2006.01)
(52) U.S. Cl.
USPC .......................................................... 706/12
(58) Field of Classification Search
USPC ....................................................... 706/12, 45
See application file for complete search history.

(56) References Cited

U.S. PATENT DOCUMENTS

| 6,380,934 | B1 | 4/2002 | Freeman et al. | |
|---|---|---|---|---|
| 6,968,332 | B1 | 11/2005 | Milic-Frayling et al. | |
| 7,970,808 | B2* | 6/2011 | Konig et al. | 707/962 |
| 2008/0065623 | A1 | 3/2008 | Zeng et al. | |
| 2008/0243479 | A1* | 10/2008 | Cafarella et al. | 704/9 |
| 2009/0019032 | A1* | 1/2009 | Bundschus et al. | 707/5 |
| 2009/0144609 | A1 | 6/2009 | Liang et al. | |
| 2009/0192967 | A1 | 7/2009 | Luo et al. | |

OTHER PUBLICATIONS

Agichtein, et al., Snowball Extractiing Relations from Large Plain-Text Collections:, International Conference on Digital Libraries, Proceedings of the fifth ACM conference on Digital libraries, San Antonio TX, 2000, pp. 85-94.
Alani, Kim, Millard, Weal, Hall, Lewis, Shadbolt, "Automatic Ontology-Based Knowledge Extraction from Web Documents", retrieved on Feb. 26, 2010 at <<http://eprints.aktors.org/105/01/IEEE-Artequaktpdf>>, IEEE Computer Society, IEEE Intelligent Systems, vol. 18, No. 1, Jan. 2003, pp. 14-21.
Andrew, et al., "Scalable Training of L1-Regularized Log-Linear Models", Proceedings of the 24th International Conference on Machine Learning, Corvalis, OR, 2007, pp. 33-40.
Banko, et al., "Open Information Extraction from the Web", Proceedings of the 20th International Joint Conference on Artifical Intelligence, Hyderabad, India, 2007, pp. 2670-2676.
Brin, "Extracting Patterns and Relations from the World Wide Web", In International Workshop on the Web and Databases, 1998, 12 pages.
Bunescu, et al., "A Shortest Path Dependency Kernel for Relation Extraction", In Proceedings of the Conference on Human Language Technology and Empirical Methods in Natural Language Processing (EMNLP-CoNLL), Vancouver, BC, Canada, 2005, pp. 724-731.
Cortes, et al., "Support-Vector Networks", Machine Learning, 20,273-297, 1995, pp. 1-25.

(Continued)

*Primary Examiner* — David Vincent
(74) *Attorney, Agent, or Firm* — Lee & Hayes, PLLC

(57) ABSTRACT

Methods and systems for Web-scale entity relationship extraction are usable to build large-scale entity relationship graphs from any data corpora stored on a computer-readable medium or accessible through a network. Such entity relationship graphs may be used to navigate previously undiscoverable relationships among entities within data corpora. Additionally, the entity relationship extraction may be configured to utilize discriminative models to jointly model correlated data found within the selected corpora.

20 Claims, 6 Drawing Sheets

OTHER PUBLICATIONS

Domingos, Richardson, "Markov Logic: A Unifying Framework for Statistical Relational Learning", retrieved on Feb. 26, 2010 at <<http://www.cs.washington.edu/homes/pedrod/papers/sr104.pdf>>, Proceedings of Workshop on Statistical Relational Learning and its Connections to Other Fields (ICML), 2004, pp. 49-54.

Etzioni, et al., "Unsupervised Named-Entity Extraction from the Web: An Experimental Study", Artificial Intelligence, 165(1):91-134, 2005, pp. 1-42.

Etzioni, Cafarella, Downey, Kok, Popescu, Shaked, Soderland, Weld, Yates, "Web-Scale Information Extraction in KnowItAll (Preliminary Results)", retrieved on Feb. 26, 2010 at <<http://turing.cs.washington.edu/papers/www-paper.pdf>>, ACM, Proceedings of Conference on World Wide Web (WWW), May 17, 2004, pp. 100-110.

Giuliano, . et al., "Exploiting Shallow Linguistic Information for Relation Extraction from Biomedical Literature", In EACL, 2006, pp. 401-408.

Harabagiu, et al., "Shallow Semantics for Relation Extraction", In Proceedings of the Nineteenth International Joint Conference on Artificial Intelligence, 2005, 6 pages.

Huynh, et al., Discriminative Structure and Parameter Learning for Markov Logic Networks:, In Proceedings of the 25th International Conference on machine Learning, Helsinki, Finland, 2008, 8 pages.

Kaban, On Bayeasian Classification with Laplace Priors, Pattern Recognition Letters, 28(10):1271-1282, 2007, pp. 1-22.

Kok, et al., "Extracting Semantic Networks from Text via Relational Clustering", In Proceedings of the 2008 European Conference on Machine Learning and Knoledge Discovery in Databases, Antwerp, Belgium, 2008, 16 pages.

Kok, et al., "Learning the Structure of Markov Logic Networks", In Proceedings of teh 22nd International Conference on machine Learning, Bonn, Germany, 2005, 8 pages.

Kok, et al., "Statistical Predicate Invention", In Proceedings of the 24th International Conference on Machine Learning, Corvallis, OR, 2007, 8 pages.

Lafferty, et al., "Conditional Random Fields: Probabilistic Models for Segmenting and Labeling Sequence Data", ICML, 2001, 8 pages.

Lowd, Domingos, "Efficient Weight Learning for Markov Logic Networks", retrieved on Feb. 26, 2010 at <<http://www.cs.washington.edu/homes/lowd/pkdd07lowd.pdf>>, Springer-Verlag Berlin, Proceedings of Conference on Principles and Practice of Knowledge Discovery in Databases, Lecture Notes in Artificial Intelligence, vol. 4702, 2007, pp. 200-211.

McCallum, et al., "A Note on the Unification on Information Extraction and Data Mining using Conditional-Probability, Relational Models", In IJCAI-2003 Workshop on Learning Statistical Models from Relational Data, 2003, 8 pages.

McCallum, "Efficiently Inducing Features of Conditional Random Fields", In UAI, 2003, 8 pages.

Nie, et al., "Object-level Vertical Search", In Third Biennial Conference on Innovative Data Systems Research (IDR), Jan. 7-10, 2007, asilomar, CA, pp. 235-246.

Nie, Wu, Wen, Ma, "Template-IndependentWeb Object Extraction", retrieved on Feb. 26, 2010 at <<http://research.microsoft.com/en-us/um/people/znie/icde_submision2006.pdf>>, Proceedings of Conference on World Wide Web (WWW), May 22, 2006, pp. 1-10.

Pasca, "Acquisition of Categorized Named Entities for Web Search", retrieved on Feb. 26, 2010 at <<http://delivery.acm.org/10.1145/1040000/1031194/p137-pasca.pdf?key1=1031194&key2=4191605711&coll=GUIDE&dl=GUIDE&CFID=18448681&CFTOKEN=91135029>>, ACM, Proceedings of Conference on Information and Knowledge Management (CIKM), Nov. 8, 2004, pp. 137-145.

Pietra, et al., "Inducing Features of Random Fields", IEEE Transactions Pattern Analysis and Machine Intelligence, vol. 19. No. 4, Apr. 1997, 13 pages.

Poon, et al., "Joint Inference in Information Extraction", In Associaiton for the Advancement of Artificial Intelligence, 2007, p. 913-918.

Richardson, et al., "Markov Logic Networks", Machine Learning, 62(1-2):107-136, 2006, 44 pages.

Riloff, Jones, "Learning Dictionaries for Information Extraction by Multi-Level Bootstrapping", retrieved on Feb. 26, 2010 at <<http://www.cs.cmu.edu/afs/cs.cmu.edu/project/theo-11/www/wwkb/aaai99iedict-rj.ps.gz>>, AAAI Proceedings of Conference on Artificial Intelligence, 1999, pp. 474-479.

Shinyama, et al., "Preemptive Information Extraction using Unrestricted Relation Discovery", Proceedings of the Human language Technology Conference of the North American Chapter of the ACL, New York, Jun. 2006, pp. 304-311.

Sigletos, Paliouras, Spyropoulos, Hatzopoulos, "Mining Web sites using wrapper induction, named entities and post-processing", retrieved on Feb. 26, 2010 at <<http://km.aifb.uni-karlsruhe.de/ws/ewmf03/papers/Sigletos.pdf>>, Springer Berlin, Web Mining: FromWeb to SemanticWeb, vol. 3209, Sep. 8, 2004, pp. 97-112.

Single, et al., "Discriminative Training of Markov Logic Networks", In American Association for Artificial Intelligence, 2005, pp. 868-873.

Teo, et al., "A\a Scalable Modular Convex Solver for Regularized Risk Minimization", Proceedings of the 13th ACM SIGKDD International Conference on Knowledge Dicovery and Data Mining, San Jose, CA, 2007, pp. 727-736.

Tibshirani, "Regression Shrinkage and Selection via the Lasso", Journal of the Royal Statistical Society. Series B (Methodological), vol. 58, No. 1, 1996, pp. 267-288.

Zhu, Nie, Liu, Zhang, Wen, "StatSnowball: a Statistical Approach to Extracting Entity Relationships", ACM, Proceedings of Conference on World Wide Web (WWW), Apr. 20, 2009, pp. 101-110.

Zelenko, et al., "Kernel Methods for Relation Extraction", Journal of machine Learning Research, (3):1083-1106, 2003, 24 pages.

Zhu, Nie, Zhang, Wen, "Dynamic Hierarchical Markov Random Fields and their Application to Web Data Extraction", retrieved on Feb. 26, 2010 at <<http://research.microsoft.com/en-us/um/people/znie/ICML2007_DHMRF.pdf>>, ACM, Proceedings of Conference on Machine Learning (ICML), vol. 227, 2007, pp. 1175-1182.

Zhu, et al., "Simultaneous Record Detection and Attribute Labeling in Web Data Extraction", In Proceedings of the 12th ACM SIGKDD International Conference on Knowledge Discovery and Data Mining, Philadelphia, PA, 2006, pp. 494-503.

* cited by examiner

WEB-SCALE ENTITY RELATIONSHIP EXTRACTION THAT EXTRACTS PATTERN(S) BASED ON AN EXTRACTED TUPLE

BACKGROUND

The World Wide Web (Web) has been ever growing and rapidly expanding since its inception. Additionally, since the widespread household use of personal computers, the Web has gained popularity among consumers and casual users. Thus, it is no surprise that the Web has become an enormous repository of data, containing various kinds of valuable semantic information about real-world entities, such as people, organizations, and locations. For example, many Web documents available through the Internet may contain information about real-world relationships that exist between people, groups, and/or places. Unfortunately, these relationships may not always be automatically discoverable, automatically identified, or even searchable.

In many cases, these relationships may only be manually detected. However, due to the amount of data currently available over the Web, manual entry of such relationship identification would be too time consuming to allow for the effective creation of a web-scale relationship graph. Yet, such a graph would be invaluable for searching previously undiscoverable and, thus, un-extractable relationship information.

Unfortunately, adequate tools do not exist for effectively detecting and extracting entity relationship information from the Web. Existing extraction tools merely identify and extract information based on pre-specified relations and relation-specific human-tagged examples. Accordingly, there is a need for relationship extraction systems and methods that are robust enough to identify new relationships and handle Web-scale amounts of data.

BRIEF SUMMARY

This summary is provided to introduce simplified concepts for Web-scale entity relationship extraction, which are further described below in the Detailed Description. This summary is not intended to identify essential features of the claimed subject matter, nor is it intended for use in determining the scope of the claimed subject matter. Generally, the Web-scale entity relationship extraction described herein involves using discriminative and/or probabilistic models to discover and extract entity relationships that exist in data corpora made-up of documents such as Web documents.

In one aspect, Web-scale entity relationship extraction may be effectuated by receiving relationship seeds and an initial model as inputs to an iterative process. In this context, relationship seeds may be initial relation tuples (i.e., ordered lists of relationship data) containing identification of given entities (such as people, groups, or places) and their relationships (described with keywords). Additionally, the initial model may be empty or it may be a discriminative Markov Logic Network (MLN) model or other discriminative and/or probabilistic model for modeling an extraction technique. The relationship seeds may be made up of entities found in a data corpus and/or one or more relation keywords. During the iterative process, new models may be learned, new tuples may be extracted, new patterns may be generated and selected from the extracted tuples, and the selected patterns may then be used as inputs to iteratively learn new models. The iterative process may identify and extract new relationship tuples from the data corpus until no new relationship tuples are extracted. Additionally, the extraction task may be defined at the entity-level, the sentence-level, the page-level, and/or the corpus-level. Finally, the extracted relationship tuples may be clustered to connect same-type tuples and the relationship data may be output for various purposes.

In another aspect, an incremental entity relationship extraction method may be configured to iteratively mine entity relations from a data corpus and build an entity relationship graph based on the mined entity relationships. The iterative entity relation mining may be accomplished by extracting entity information from the data corpus and detecting relationships between the entities found within the text of the data corpus. The entities for which relationships are mined may be people, locations, and/or organizations. The data corpus may be made up of Web documents, Web pages available over the Internet, documents available over any type of network, or documents not available over a network at all (e.g., locally stored documents).

In yet another aspect, an entity relationship extraction system may be configured to iteratively receive relationship seeds and an initial model (which may be empty), learn a new model based on the seeds and the initial model, extract relationship tuples from a data corpus by applying the newly learned model, generate patterns based on the extracted tuples, assign weights to the generated patterns, and select from the generated patterns based on the assigned weights. The selected patterns may then be fed back into the iterative system to allow for new models to be learned. Alternatively, if the initial model is empty, the system may generate an initial model with which to begin the iterative process. Additionally, the system may be configured to cluster the extracted relationship tuples to connect relationships of the same type and output the clustered relationship tuples for open information extraction (Open IE). The model learning, relationship extraction, weight assignments, and pattern selections may be accomplished by discriminative MLN models, for example.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes Web-scale entity relation extraction. In particular, systems and iterative bootstrapping methods are presented for inputting very minimal seeds (i.e., initial data such as a set of given entities and their inter-relationship) followed by learning discriminative models, extracting relationship information from a data corpus, generating patterns based on the extracted data, and selecting patterns with higher weights. The iterative process may continue until no more relationship data is extracted from the data corpus. Additionally, the relationship data may be clustered to group relationships of the same type prior to outputting the relationship data.

As discussed above, entity relationships found within Web documents, or documents existing on any type of information network, are difficult to discover and extract automatically. Even worse, traditionally, new relationships that arise between entities are impossible to detect if they have not been previously categorized. These problems, and the need for accurate entity relationship detection and extraction, are compounded by the ever increasing size of the Internet.

The techniques described in this disclosure may be used for effectively solving the foregoing problems by searching documents (including Web pages) for known and new relationships between entities, iteratively extracting all entity relationships found, and creating an entity relationship graph that may be accessed and searched by users. Additionally, the clusters that are output may be used for assigning new keywords during Open IE when new relationships are found. Open IE is a process of identifying various new (or previously unidentified) types of relationships without requiring the pre-specification of relationship types.

Extracting entity relationships entails discovering and extracting relationship tuples to form an entity relationship graph. As discussed above, a relationship tuple is an ordered list of elements. Specifically, a relationship tuple may be a first entity, a second entity, and a list of keywords defining the relationship(s) between the two entities. An iterative process for extracting relationship tuples is disclosed which may begin with a given relationship tuple and with or without an initial model.

Figure 1:
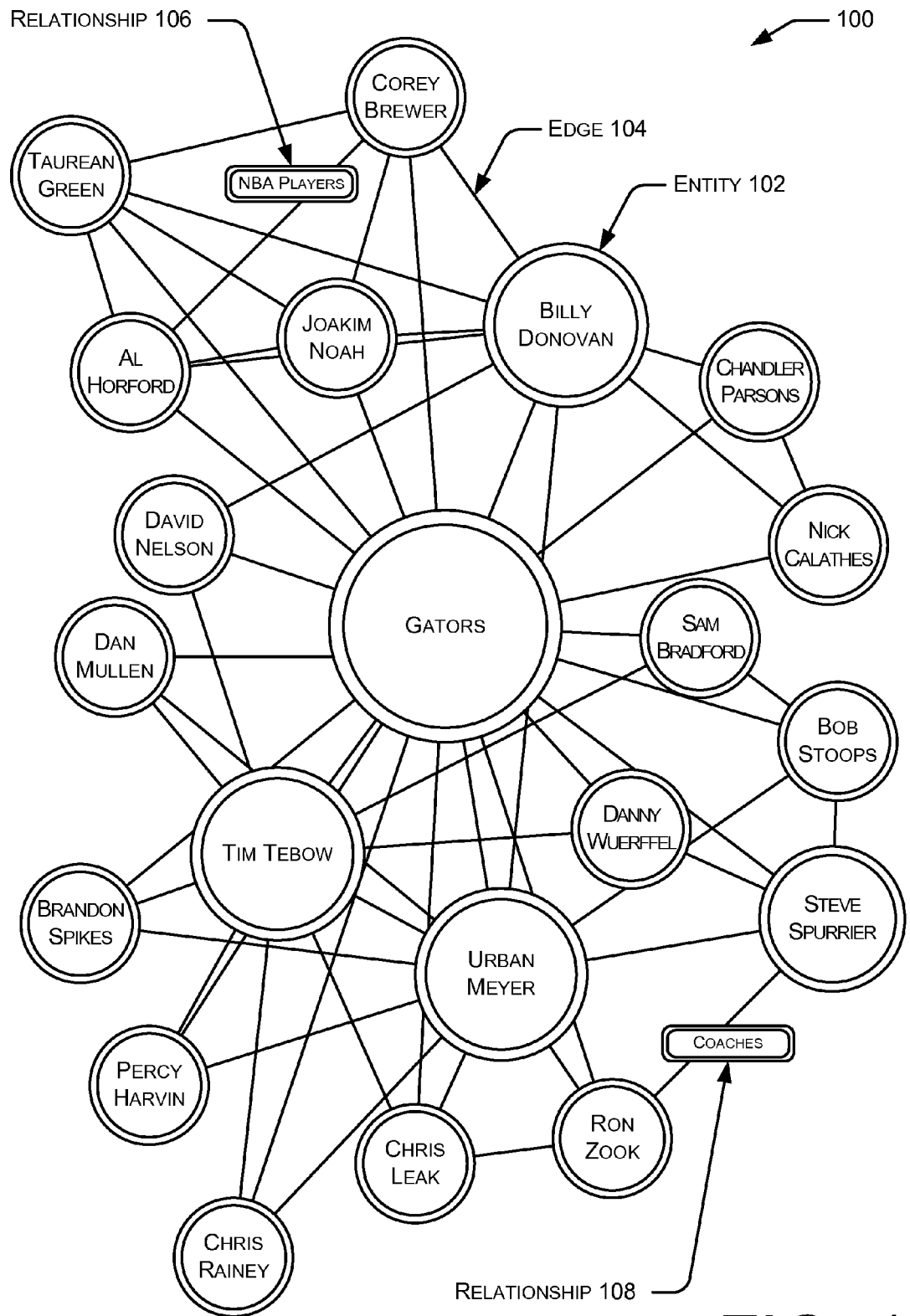
FIG. 1 is a block diagram of an illustrative entity relationship graph.

FIG. 1 depicts an illustrative relationship graph 100 that may be formed from extracted relationship tuples and displayed to a user. By way of example only, this graph may represent entity relationships discovered and extracted from Web documents and then displayed in response to a user's query of the term "Gators." The graph 100 includes several entities 102 represented by circles and edges 104 connecting the circles. As seen in FIG. 1, each entity 102 may have at least one edge 104 connecting to another entity 102. For ease of explanation, each entity 102 in FIG. 1 will be referenced by the name within the circle.

Additionally, as can be seen in FIG. 1, entities may be ranked by relevance to a search query or by number of relationships extracted. For example, the "Gators" entity is displayed in the graph 100 as the largest entity 102. This may be because it represents the search term or because it has the most edges 104 connecting it to other entities 102. Again, the fact that the "Gators" entity has the most edges 104 connecting other entities 102 may signify that the system and/or methods of this disclosure have discovered and extracted more relationships for "Gators" than for the other entities in the graph. Additionally, as seen in FIG. 1, "Tim Tebow," "Urban Meyer," and "Billy Donovan" are the next largest entities in size. This may be because they each contain the next largest number of edges 104 in the graph.

In one aspect, the relationship graph 100 may be displayed on an output device such as a monitor in response to a user query. Additionally, as part of a graphical user interface (GUI), when a user places a cursor (not shown) over an edge 104, specific relationship information may be displayed. For example, if a user's cursor were placed on the edge 104 between the entities of "Al Horford" and "Corey Brewer," the GUI may display relationship 106. In this example, relationship 106 may be "NBA Players" because the relationship extraction determined that both Al Horford and Corey Brewer are current NBA players. In another example, relationship 108 may display "Coaches" when a cursor hovers over the edge 104 connecting the entities of "Ron Zook" and "Steve Spurrier" because the relationship extraction determined that both Ron Zook and Steve Spurrier are current coaches. In yet another example, relationship 108 may also display "Past Coaches" (not shown) based on the extracted data that indicates that both Ron Zook and Steve Spurrier previously coached, but no longer coach, the Gators.

FIG. 1 provides a simplified example of a suitable relationship graph formed based on a Web-scale entity relationship extraction according to the present disclosure. However, other configurations and alternative graphical representations are also possible. For example, while the entities 102 are represented as circles, they may be displayed by the GUI as any shape. Further, while the query and, subsequently, the displayed graph in FIG. 1 corresponded to a "Gators" query, a query for any entity (person, group, or location) would also be supported.

Illustrative Web-Scale Entity Relationship Extraction

Figure 2:
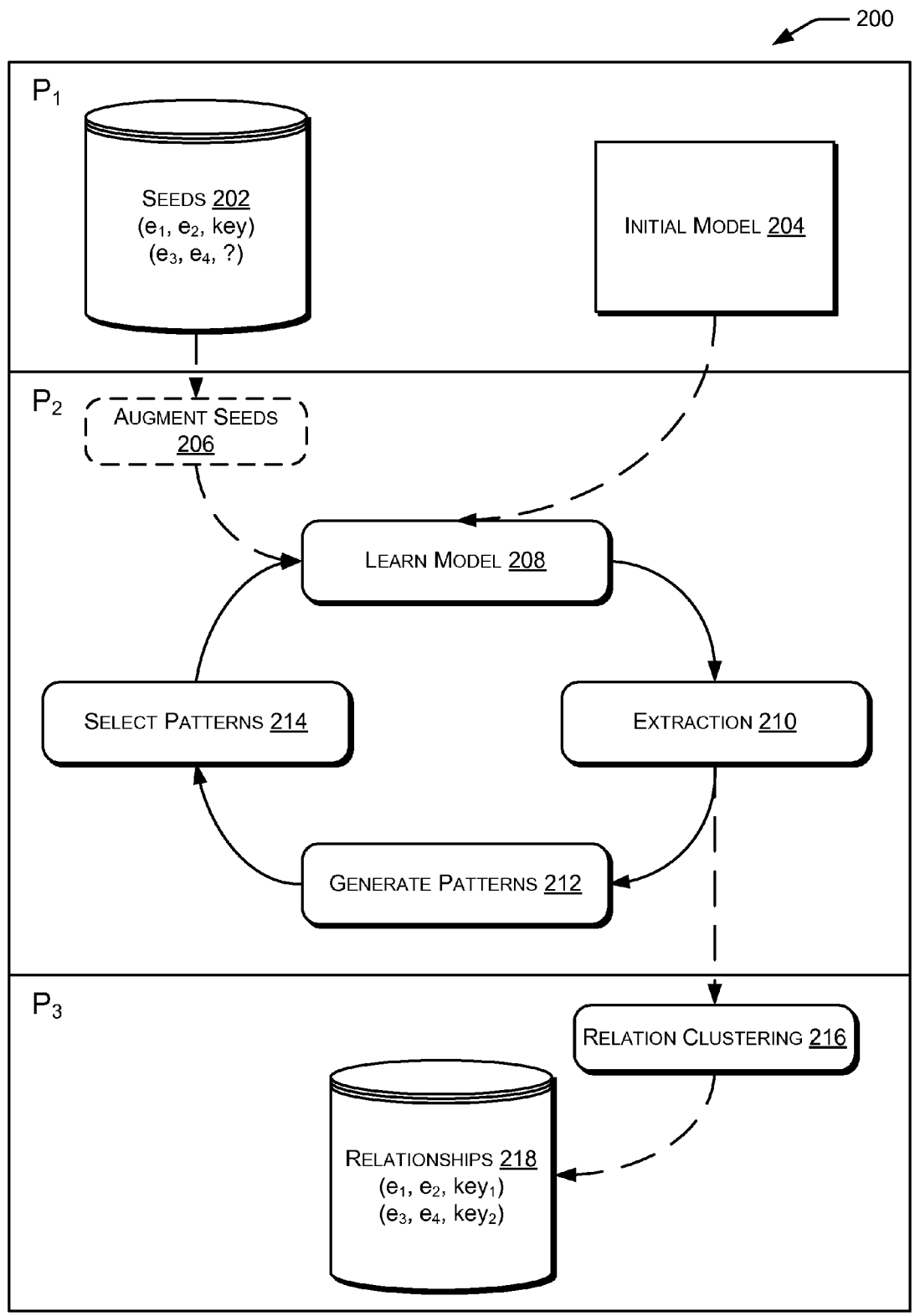
FIG. 2 is a block diagram of an illustrative method of Web-scale entity relationships extraction.

FIG. 2 is an illustrative block diagram illustrating Web-scale entity relationship extraction 200. By way of example, and not limitation, Web-scale entity relationship extraction 200 may include three parts, input $P_1$, statistical extraction model $P_2$, and output $P_3$. One task of Web-scale entity relationship extraction 200 may be to identify relation tuples, for example ($e_i$, $e_j$, key) i≠j, where $e_i$ and $e_j$ are two entities, key is a set of keywords that indicate a relationship, and i and j represent indices. Additionally, Web-scale entity relationship extraction 200 may be configured, assuming that the entities are given, to detect relationships (i.e., decide whether a relationship exists between two entities) and categorize the relationships (i.e., assign relation keywords to a detected relationship) between entities found in a data corpus.

The input $P_1$ may contain a set of seeds 202 and an initial model 204. The seeds 202 may or may not contain relation keywords that indicate the relationships between the entities. Thus, two types of seeds 202 exist: seeds 202 with relation keywords such as ($e_1$, $e_2$, key) and seeds 202 without relation keywords such as ($e_3$, $e_4$, ?). Similarly, the initial model 204 may contain a model such as a discriminative MLN model, or it may be empty. If the initial model 204 is empty, the Web-scale entity relationship extraction 200 may first use the seeds 202 to generate extraction patterns in order to start the iterative process (the statistical extraction model) $P_2$. On the other hand, if the initial model 204 is designated, the statistical extraction process $P_2$ may begin by using the initial model 204 and the supplied seeds 202.

The statistical extraction model $P_2$ may contain up to five operations including, but not limited to, augmenting the seeds at block 206, learning a model at block 208, extracting at block 210, generating patterns at block 212, and selecting patterns at block 214. Augmenting the seeds at block 206 may involve finding more seeds within a document or data corpus prior to beginning the iterative statistical extraction model $P_2$. In one aspect, augmenting the seeds at block 206 may apply strict keyword matching rules in order to get high quality training seeds for the model $P_2$.

By way of example, and not limitation, each round of the iterative model $P_2$ may begin with learning a model at block 208. In the first round of the iterative model $P_2$, learning a model at block 208 may use the input seeds 202 and the initial model 204 (whether supplied or empty) to learn an extractor. However, in later rounds of the iterative model $P_2$, the input seeds 202 and the initial model 204 may be replaced by patterns which are generated and selected (described below).

In any event, learning a model at block 208 may be accomplished by applying an $l_2$-norm regularized maximum likelihood estimation (MLE) to learn new extraction models for extracting relationships from the data corpus. Additionally, in one aspect, batch learning may be applied, while in another aspect on-line learning may be used in learning a model at block 208.

By way of example, and not limitation, extracting at block 210 may follow learning a model at block 208. Additionally, extracting at block 210 may include using the model learned in learning a model at block 208 to extract new relation tuples from the data corpus. As described in detail below, probabilistic models may be used in extracting at block 210 to extract relationships from at least three different levels: an entity-level, a sentence-level, and a page- or corpus-level.

By way of example only, generating patterns at block 212 may follow extracting at block 210 by generating new extraction patterns based on the newly identified relation tuples. In other words, the relation tuples extracted during extracting at block 210 may be used to generate new extraction patterns during generating patterns at block 212. Additionally, these generated patterns may be used to compose formulae of MLN.

Also by way of example only, selecting patterns at block 214 may follow generating patterns at block 212. In selecting patterns at block 214, the recently composed MLN formulae may be ranked and/or weighted based on a probability of whether the formulae are true. In $l_1$-norm regularized MLE pattern selection at block 214, every formulae gets a weight which indicates the strength of the truth of the formulae. The $l_1$-norm training algorithm may tend to set the weight of low confidence formulae to zero, and these formulae may be discarded during selecting patterns at block 214. In one aspect, the formulae are weighted using an $l_1$-norm regularized MLE, which may set some formulae's weights to zeros. Additionally, zero-weighted formulae may be removed from the formula list such that only non-zero-weighted formulae are used for further processing. Once ranked and/or weighted, selecting patterns at block 214 may select appropriately ranked and/or weighted formulae (i.e., the generated patterns) to be added to the probabilistic model and retrained by learning a model at block 208. In this way, by retraining (i.e., using learning a model at block 208 to learn new models based on the selected patterns), the iterative model $P_2$ may continue to identify and extract entity relationships until no new extraction tuples are identified and/or no new patterns are generated.

The output $P_3$ may be used for generating relationship graphs and/or accomplishing Open IE and may include relation clustering at block 216 and a final set of relationships 218. For example, when the Web-scale entity relationship extraction 200 is configured to perform Open IE, the extraction results from the iterative model $P_2$ may be general relation tuples. To make the results more readable, the output $P_3$ may apply relation clustering methods at the relation clustering at block 216 to group the relation tuples and assign relation keywords to them. In this way, the missing keywords from $P_1$, if any, may be filled-in here to arrive with the final set of relationships 218 including such relationship tuples as ($e_1$, $e_2$, $key_1$) and ($e_1$, $e_2$, $key_2$). Additionally, any extracted tuples that may be missing keywords may be filled-in as well.

Additionally, and also by way of example and not limitation, the input P1, the iterative model P2, and the output P3 are shown in FIG. 1 as three separate parts; however, they may be considered in any combination, such as but not limited to, being implemented as one part. Additionally, the output P3 and the iterative model P2 may be effectively implemented as one iterative model P2 (not shown as such). In that case, the relation clustering at block 216 may be performed during each iterative pass through the iterative model P2. Further, although not shown in FIG. 2, after the relation clustering at block 216, the relationship tuples with newly formed keywords may be fed back into the relationship extraction 200 for further processing based on the new keywords.

In one aspect, the Web-scale entity relationship extraction 200 may iteratively solve an $l_1$-norm regularized optimization problem based on the following equation:

$$P: w^* = \arg\min_w LL(D,R,w) + \lambda \|w\|_1 \qquad (1)$$

where LL (D, R, w) may be the loss defined on the corpus D given a set of patterns (which may be represented as formulae in the probabilistic model) R and the model weights w; and $\|.\|_1$ is the $l_1$-norm. The data corpus D and pattern set R may be updated at each iteration. For D, the change may be that new relation tuples may be identified. For R, the change may be in the sense that new patterns may be added. For the problem P, in one aspect, the loss may be the log-loss as typically used in probabilistic models. However, in another aspect, the loss for the problem P may be the hinge loss as typically used in support vector machines. Additionally, the $l_1$-norm regularized MLE problem may yield a sparse estimate by setting some components of w to exact zeros and may use a solver like the Orthant-Wise Limited-memory Quasi-Newton method, or any other known solvers.

FIG. 2 provides a simplified example of a suitable Web-scale entity relationship extraction 200 according to the present disclosure. However, other configurations are also possible. For example, as noted above, while three parts of the extraction are shown, namely P1, P2, and P3, any number of parts could be used. Additionally, while a specific number of steps are shown in each part, more or less steps in any order may be implemented to effectuate the disclosed relationship extraction 200. Further, while specific probabilistic and/or discriminative models are discussed regarding specific steps of the extraction 200, any probabilistic model, discriminative model, generative model, or combinations of any of the foregoing, or the like, may be used.

Figure 3:
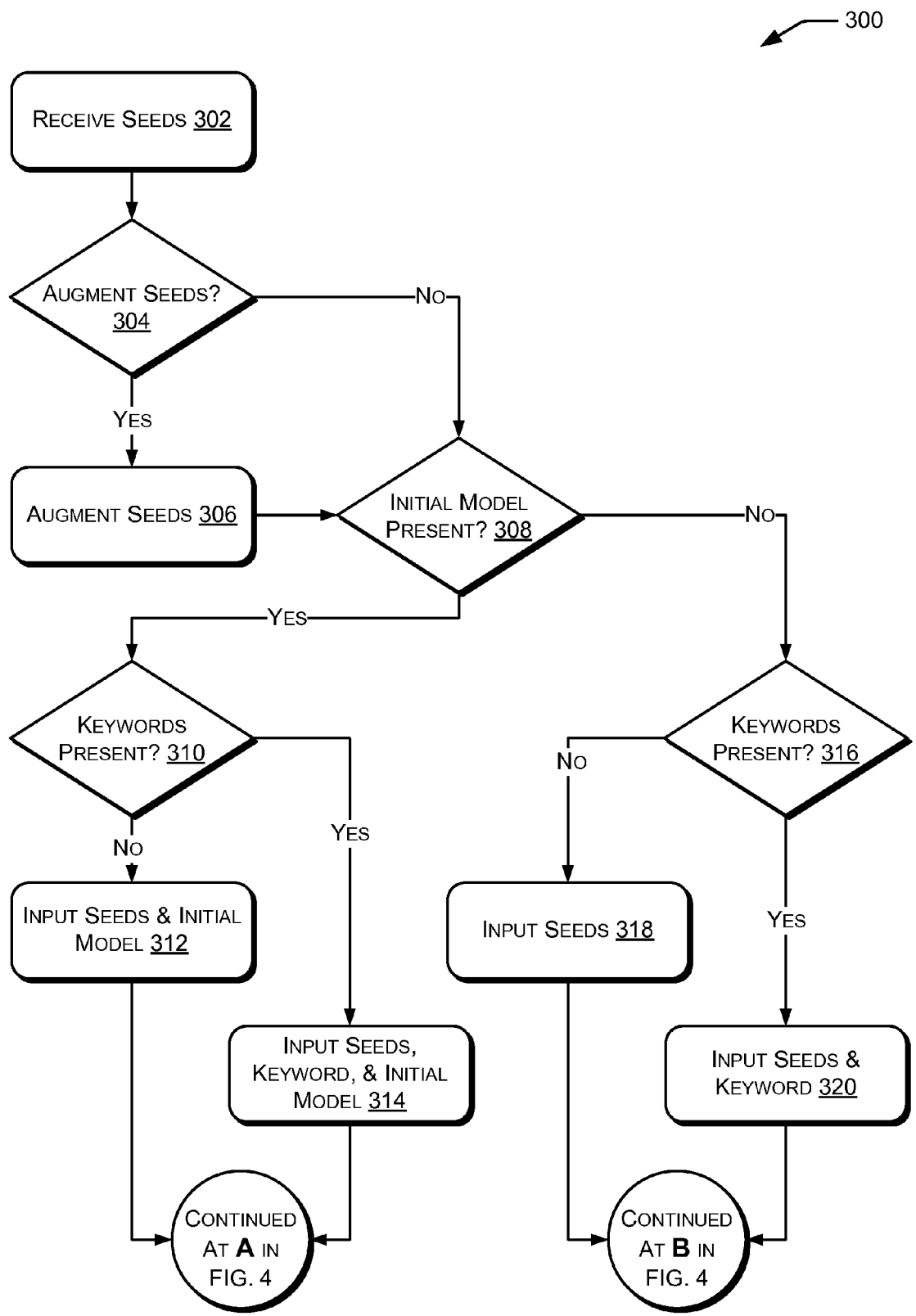
FIG. 3 is a flowchart illustrating details of the Web-scale entity relationship extraction method of FIG. 2.

FIG. 3 is a flow diagram of one illustrative method 300 for implementing Web-scale entity relationship extraction 200. As discussed above, Web-scale entity relationship extraction 200 may be responsible for identifying and extracting real-world entity relationships from within documents, including Web documents. In this particular implementation, the method 300 may begin at block 302 in which the method 300 may receive various seeds from an input device. Generally, as noted above, the seeds may contain two different types of entities (e.g., people, places, or groups) and may or may not contain an initial model.

At decision block 304, the method 300 determines whether to augment the seeds. Augmenting the seeds may entail applying strict keyword matching rules to find more seeds than input. By way of example, and not limitation, an initial seed may contain the relationship (Bill Gates, husband, Melinda Gates). Under strict keyword matching rules, the method 300 may apply the pattern "A is the husband of B" in an attempt find matches among all the sentences to locate more husband relationships, where A and B stand for arbitrary person names. If the method 300 encounters the sentence, "Bill Clinton is the husband of Hillary Clinton," the method 300 may augment the seeds by adding the relation tuple (Bill Clinton, husband, Hillary Clinton). Thus, strict keyword matching can make for accurate, yet relatively minimal results, and therefore, it may be used by the method 300 at block 304 to acquire more accurate seeds. Method 300 may determine, based on preset rules and the number and type of seeds input at block 302, whether to augment the seeds or, alternatively, a user or administrator may determine whether to augment the seeds. If seed augmentation is to be performed, the method 300 augments the seeds by finding more seeds to augment the originally input seeds at block 306. Again, seed augmentation may be performed by using strict keyword matching rules; however, it may also be performed by using any of the probabilistic and/or discriminative models described herein.

Whether seed augmentation is performed at block 306 or not, at decision block 308, the method determines whether an initial model is present. For example, the input may, or may not, include an MLN extraction model or other type of extraction model. If the initial model is present, the method 300 may determine, at decision block 310, whether a keyword is present within the initial seed tuples. For example, as noted above, some initial seeds may contain keywords while other initial seeds may not. If no keywords exist among the relation tuples, the method 300 may input the keywordless seeds and the initial model into the iterative model $P_2$ of FIG. 2 at block 312 and continue to A in FIG. 4. Additionally, if keywords do exist within the relation tuples, i.e., ($e_1$, $e_2$, key), the method 300 may input the seeds (which include the keywords) and the initial model into the iterative model $P_2$ of FIG. 2 at block 314 and also continue to A in FIG. 4. Here, regardless of whether keywords are present, the method 300 may continue in the same fashion because in both instances the initial model is present.

On the other hand, if the initial model is not present, the method 300 may determine, at decision block 316, whether a keyword is present within the initial seed tuples. For example, as noted above, some initial seeds may contain keywords while other initial seeds may not. If no keywords exist among the relation tuples, the method 300 may input the keywordless seeds into the iterative model $P_2$ of FIG. 2 at block 318 and continue to B in FIG. 4. Additionally, if keywords do exist within the relation tuples, i.e., ($e_1$, $e_2$, key), the method 300 may input the seeds (which include the keywords) into the iterative model $P_2$ of FIG. 2 at block 320 and also continue to B in FIG. 4. Here, regardless of whether keywords are present, the method 300 may continue in the same fashion because in both instances the initial model is not present and may need to be learned prior to beginning the iterative model $P_2$.

Figure 4:
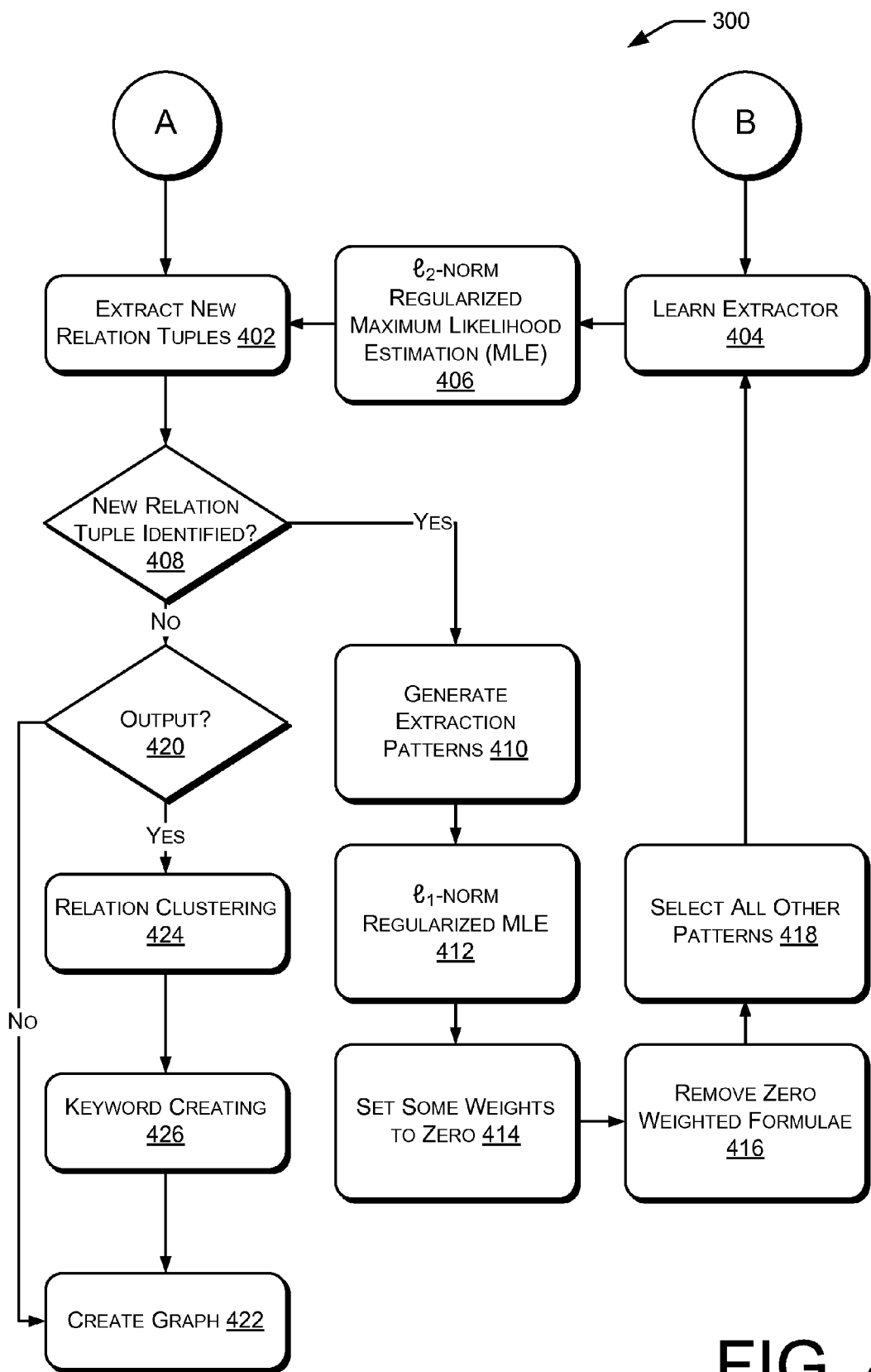
FIG. 4 is a flowchart illustrating additional details of the Web-scale entity relationship extraction method of FIG. 2.

FIG. 4 is a flow diagram illustrating additional details of method 300 for implementing Web-scale entity relationship extraction 200. In this particular implementation, the method 300 may continue at either block 402 or 404 based on the determination made at decision block 308 of FIG. 3. If the method 300 had previously determined that an initial model was present, the method 300 may proceed to block 402 to extract new relation tuples. However, if the method 300 had previously determined that no initial model was present, the method 300 may proceed to block 404 to learn a new extraction model.

As noted above, the iterative model $P_2$ may, but need not necessarily, begin by learning a model. In this aspect, as seen in FIG. 4, an iterative process may begin at block 404 if no initial model was given or it may begin at block 404 if an initial model was supplied. In any event, after the method 300 proceeds to block 402 it may apply an $l_2$-norm regularized maximum likelihood estimation (MLE) to accomplish the extraction model learning at block 406. Once a new model is learned through application of the MLE, or in the case when an initial model was supplied (see above), the method 300 may continue to extract new relation tuples based on the learned (or supplied) extraction model at block 402.

At decision block 408, the method 300 may determine whether new relation tuples have been identified from among the data corpus (i.e., whether additional relationships were extracted on the last pass of the iterative model $P_2$). If new relation tuples were identified at decision block 404, the method 300 may generate extraction patterns at block 410 by applying an $l_1$-norm regularized MLE at block 412. The applied $l_1$-norm regularized MLE may also be responsible for setting some weights of the newly generated extraction patterns to zero at block 414. The method 300 may then remove the zero weighted formula at block 416 in order to eliminate low probability patterns from being used by the iterative model $P_2$. Additionally, the method 300 may then select all other patterns at block 418, i.e., only the patterns with a high probability of relevancy are selected, and pass those patterns back to block 404 for learning of additional new extractors.

In the alternative, if at decision block 408 it was determined that no new relation tuples were identified, the method 300 may exit the iterative model $P_2$ and continue to the output phase $P_3$. At decision block 420, the method 300 may determine whether to output relationship information. If not, the method 300 may terminate by creating a relationship graph at block 422 based on the relationship information extracted from the data corpus. In this case, a relationship graph similar to that seen in FIG. 1 may be created and stored in a computer readable medium. If, however, it is determined to output the relationship information, the method 300 may cluster all the relationship tuples at block 424. Relationship clustering may be effectuated by grouping all similarly typed tuples together. Additionally, the method 300 may then create keywords at 426 for all tuples that are missing keywords. In this way, new categories of relationships may be created that were detected but not previously categorized. Finally, the method 300 may terminate by creating a graph as discussed above; however, this graph may be more complete as it may contain new, previously unnamed relationships.

Illustrative Computing Environment

Figure 5:
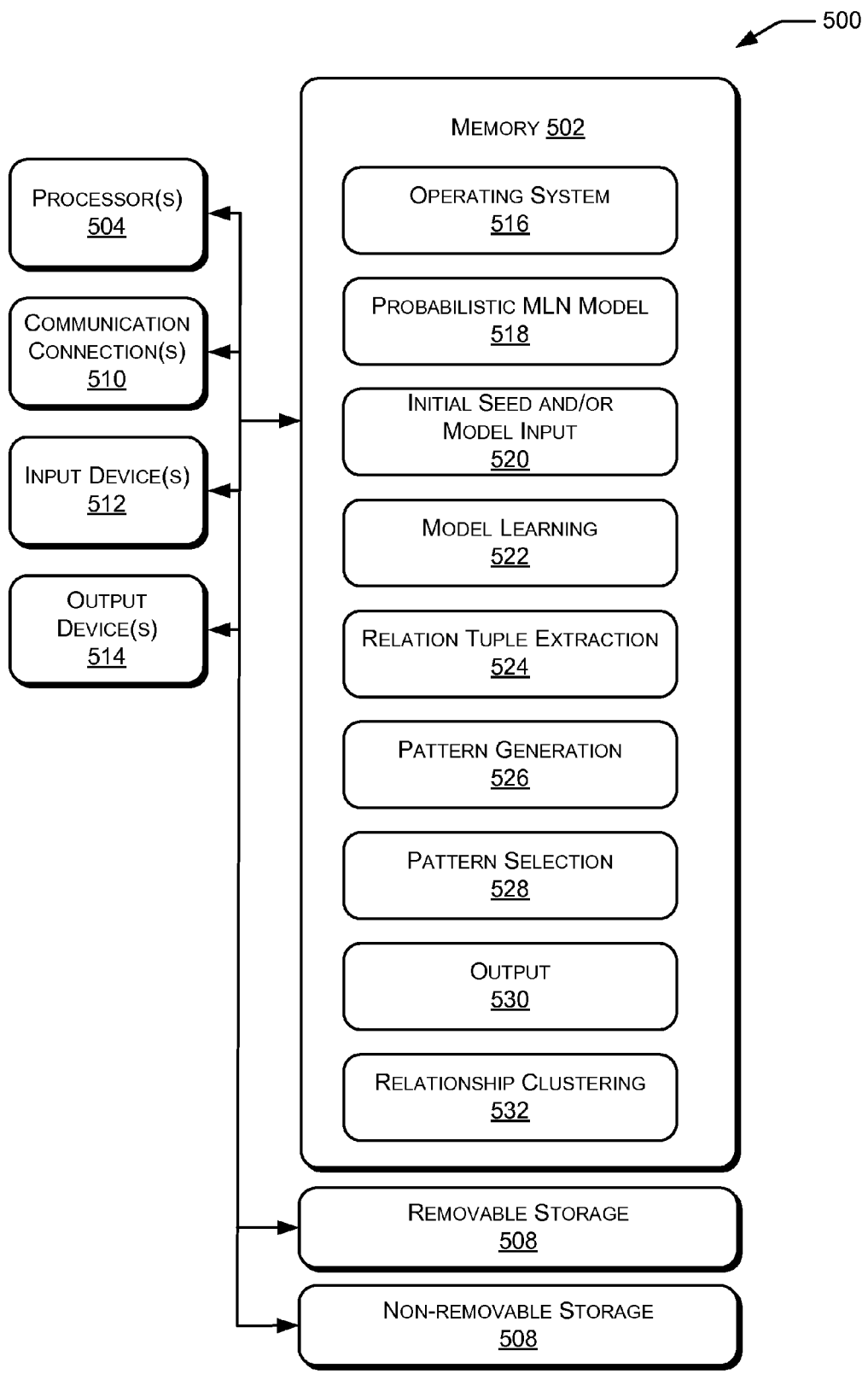
FIG. 5 is a block diagram of a computer environment showing an illustrative system in which a Web-scale entity relationship extraction system can be implemented.

FIG. 5 provides an illustrative overview of one computing environment 500, in which aspects of the invention may be implemented. The computing environment 500 may be configured as any suitable computing device capable of implementing a Web-scale entity relationship extraction system, and accompanying methods, such as, but not limited to those described in reference to FIGS. 1-4. By way of example and not limitation, suitable computing devices may include personal computers (PCs), servers, server farms, datacenters, or any other device capable of storing and executing all or part of the extraction methods.

In one illustrative configuration, the computing environment 500 comprises at least a memory 502 and one or more processing units (or processor(s)) 504. The processor(s) 504 may be implemented as appropriate in hardware, software, firmware, or combinations thereof. Software or firmware implementations of the processor(s) 504 may include computer-executable or machine-executable instructions written in any suitable programming language to perform the various functions described.

Memory 502 may store program instructions that are loadable and executable on the processor(s) 504, as well as data generated during the execution of these programs. Depending on the configuration and type of computing device, memory 502 may be volatile (such as random access memory (RAM)) and/or non-volatile (such as read-only memory (ROM), flash memory, etc.). The computing device or server may also include additional removable storage 506 and/or non-removable storage 508 including, but not limited to, magnetic storage, optical disks, and/or tape storage. The disk drives and their associated computer-readable media may provide non-volatile storage of computer readable instructions, data structures, program modules, and other data for the computing devices. In some implementations, the memory 502 may include multiple different types of memory, such as static random access memory (SRAM), dynamic random access memory (DRAM), or ROM.

Memory 502, removable storage 506, and non-removable storage 508 are all examples of computer-readable storage media. Computer-readable storage media includes, but is not limited to, volatile and non-volatile, removable and non-removable media implemented in any method or technology for storage of information such as computer-readable instructions, data structures, program modules or other data. Memory 502, removable storage 506, and non-removable storage 508 are all examples of computer storage media. Additional types of computer storage media that may be present include, but are not limited to, phase change memory (PRAM), SRAM, DRAM, other types of RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the server or other computing device. Combinations of any of the above should also be included within the scope of computer-readable storage media.

The computing environment 500 may also contain communications connection(s) 510 that allow the computing environment 500 to communicate with a stored database, another computing device or server, user terminals, and/or other devices on a network. The computing environment 500 may also include input device(s) 512 such as a keyboard, mouse, pen, voice input device, touch input device, etc., and output device(s) 514, such as a display, speakers, printer, etc.

Turning to the contents of the memory 502 in more detail, the memory 502 may include an operating system 516 and one or more application programs or services for implementing Web-scale entity relationship extraction including a probabilistic MLN model module 518. The probabilistic MLN model module may be configured to perform joint inference to learn extraction model weights with a sphere Gaussian prior, or equivalently the $l_2$-norm penalized MLE, to avoid over-fitting.

A first-order knowledge base may contain a set of formulae, which may be constructed using constants, variables, functions, and predicates. Constants may be the objects (e.g., entities and tokens) in the interested domain and variables range over the objects. For example, "Bob" and "Jim" may be two people entities, and "killed" may be a token. Additionally, e and t may be variables which may denote an entity and a token, respectively. A function may be a mapping from a set of objects to objects (e.g., MotherOf($e_i$)) and a predicate may represent a relation among objects (e.g., HasRelation($e_i$, $e_j$) or some attributes (e.g., IsPeople($e_i$)). An atom may be a predicate applied to a set of arguments, which may be constants or variables. If an atom's arguments are all constants, it may be a ground atom. A world may be an assignment of truth values to all possible ground atoms.

If a world violates one formula, it may potentially be impossible. Thus, the formulae in a first-order logic may be viewed as a set of hard constraints on the possible worlds. Markov logic is a probabilistic extension and softens the hard constraints by assigning a weight to each formula. The weight may indicate the strength of the corresponding formula. However, when a world violates some formulae (e.g., more than one) it may potentially be less impossible, but may not be impossible. For the task of entity relation extraction, the probabilistic MLN model module 518 may be configured with the query predicates and the evidence predicates already stored. Thus, the probabilistic MLN model module 518 may partition the ground atoms into two sets—the set of evidence atoms X and the set of query atoms Q, and define a discriminative MLN. X may be all the possible features that can be extracted from the inputs, and Q may be all the relationship queries R($e_i$, $e_j$), $\forall i \neq j$ and keyword detection queries InField (t, f) $\forall_t$, f. Given an input x (e.g., a sentence and its features), the discriminative MLN may define a conditional distribution p(q|x) as follows:

$$p(q\mid x) = \frac{1}{z(w, x)} \exp\left(\sum_{i \in F_Q} \sum_{j \in G_i} w_i g_j(q, x)\right), \quad (2)$$

where $F_Q$ is the set of formulae with at least one grounding involving a query atom, $G_i$ is the set of ground formulae of the ith first-order formula, and Z(w, x) is a normalization factor, or partition function. Further, $g_j(q, x)$ may be a binary function that equals to 1 if the jth ground formula is true, and 0 otherwise.

The memory 502 may further include an initial seed and/or model input module 520. The initial seed and/or model input module 520 may be configured to receive seeds and/or initial extraction models as inputs to the extraction system. As discussed above, seeds may be made up of a pair of different entities (such as people, places, or groups) and may, or may not, include relationship keywords. Additionally, the model may be empty or it may contain an MLN model, a discriminative model, a generative model, or combinations of the foregoing, or the like. The initial seed and/or model input module 520 may receive seeds and/or models from a user, programmer, and/or administrator of the system. In one aspect, the seeds and/or models are received through an input device and passed along to iterative methods of the extraction system.

The memory 502 may further include a model learning module 522 and a relation tuple extraction module 524. As discussed above, the model learning module 522 may be configured for use when no model is input into the initial seed and/or model input module 520 or on subsequent iterations of the previously discussed iterative methods. Additionally, as noted above, the model learning module 522 may be configured to use an $l_2$-norm regularized MLE to learn new extraction models. The relation tuple extraction module 524 may be configured to identify related entity pairs and detect the keywords that indicate the relationships. Assuming that entities are given, the relation tuple extraction module 524 may be further configured to predict whether two entities $e_i$ and $e_j$ have a relation R based on the probability p(R($e_i$, $e_j$)|O). In one aspect, the relation tuple extraction module 524 may be configured to predict whether a token is a relation keyword based on three possible fields (i.e., labels) to which a token may belong. In one aspect, a token may only belong to one field, either REL-S: the start of a relation; REL-C: a continuation of a relation; or NULL: not a relation keyword. One task of the relation tuple extraction module 524 may be to predict in which field f, the token t is most likely to belong in, based on the probability p(InField(t, f)|O), where f∈{REL-S, REL- C, NULL}, and O denotes the observations that are available to make the prediction. In one aspect, based on discriminative models, O can be arbitrary features of the inputs, e.g., the next content of a token or its neighboring tokens.

In another aspect, the relation tuple extraction module 524 may be configured to extract new relation tuples based on an inference problem in probabilistic models such as MLN models. By way of example, and not limitation, if the current MLN model is defined as M, for each pair of entities ($e_i$, $e_j$), the relation tuple extraction module 524 may use M to predict whether a relationship exists between $e_i$ and $e_j$ with the probability $p(R(e_i, e_j)|x_{ij}, M)$. For each token t, the relation tuple extraction module 524 may use M to predict whether t is a relation keyword. Here, the query $R(e_i, e_j)$ may be a binary predicate and may equal 1 if a relationship exists between $e_i$ and $e_j$ and 0 otherwise. Thus, the relation tuple extraction module 524 may use the probability $p(R(e_i, e_j)|x_{ij}, M)$ noted above as a confidence measure of the identified new tuple and only keep the candidate extraction ($e_i$, $e_j$) if $p(R(e_i, e_j)|x_{ij}, M) > c$, where the higher c values may indicate stricter decision rules. Additionally, for relation keyword detection, the relation tuple extraction module 524 may query InField(t, f) and predict each token t to the label f which has the highest probability, that is, $f^* = \arg\max_f p(\text{InField}(t, f)|x_t, M)$.

The memory 502 may further include a pattern generation module 526, and a pattern selection module 528. The pattern generation module 526 may be configured to generate new extraction patterns which may be used to compose the formulae of MLNs. Generally, a good pattern should achieve a good balance between two competitive criteria—specificity and coverage. Specificity may mean that the pattern is able to identify high-quality relation tuples, while coverage may mean the pattern can identify a statistically non-trivial number of good relation tuples. In one aspect, the pattern generation module 526 may be configured to apply probabilistic models and render the pattern selection as the $l_1$-norm regularized optimization problem P described above in relation to FIG. 2. Thus, the pattern generation module 526 may be able to treat strict keyword matching patterns and general patterns identically. Also, by using general patterns, the pattern generation module 526 may be configured to perform Open IE.

The pattern selection module 528 may be configured to assign weights to the patterns generated by the pattern generation module 526 and then select appropriate patterns based on the weights to be used for retraining by the model learning module 522. By way of example, and not limitation, the pattern selection module 528 may apply the $l_1$-norm regularized MLE as defined in the problem P described above in relation to FIG. 2 and perform discriminative structure learning. As noted above, the $l_1$-norm penalty encourages a sparse estimate. In one aspect, the pattern selection module 528 may be configured to first use the generated patterns to formulate a set of candidate formulae of MLN. Then, the pattern selection module 528 may apply an algorithm to optimize the $l_1$-norm penalized conditional likelihood function as in the problem P, which may yield a sparse model by setting some formulae's weights to zeros. The zero-weighted formulae may then be discarded and the resultant model may be passed to the next step for re-training by the model learning module 522.

The memory 502 may further include an output module 530 and a relationship clustering module 532. The output module 530 may be configured to output the results of the iterative process when no more relationship tuples are detected or extracted from the data corpus. In one aspect, the output module 530 may send the relationship data for processing. In another aspect, the output module 530 may send the relationship data to a relationship graphing module (not shown) to form a relationship graph. In yet another aspect, the output module 530 may send the relationship tuples to the clustering module 532. The clustering module 532 may be configured to receive relationship tuples that have been extracted. In one aspect, the relationship clustering module 532 may be configured to group relationship tuples into categories such that relationships of the same type are grouped together. In another aspect, the relationship clustering module 532 may be configured to add keyword names to extracted relationship tuples that are missing keywords.

Illustrative Extraction Based on Intra- and Inter-Relationship Dependency

Figure 6:
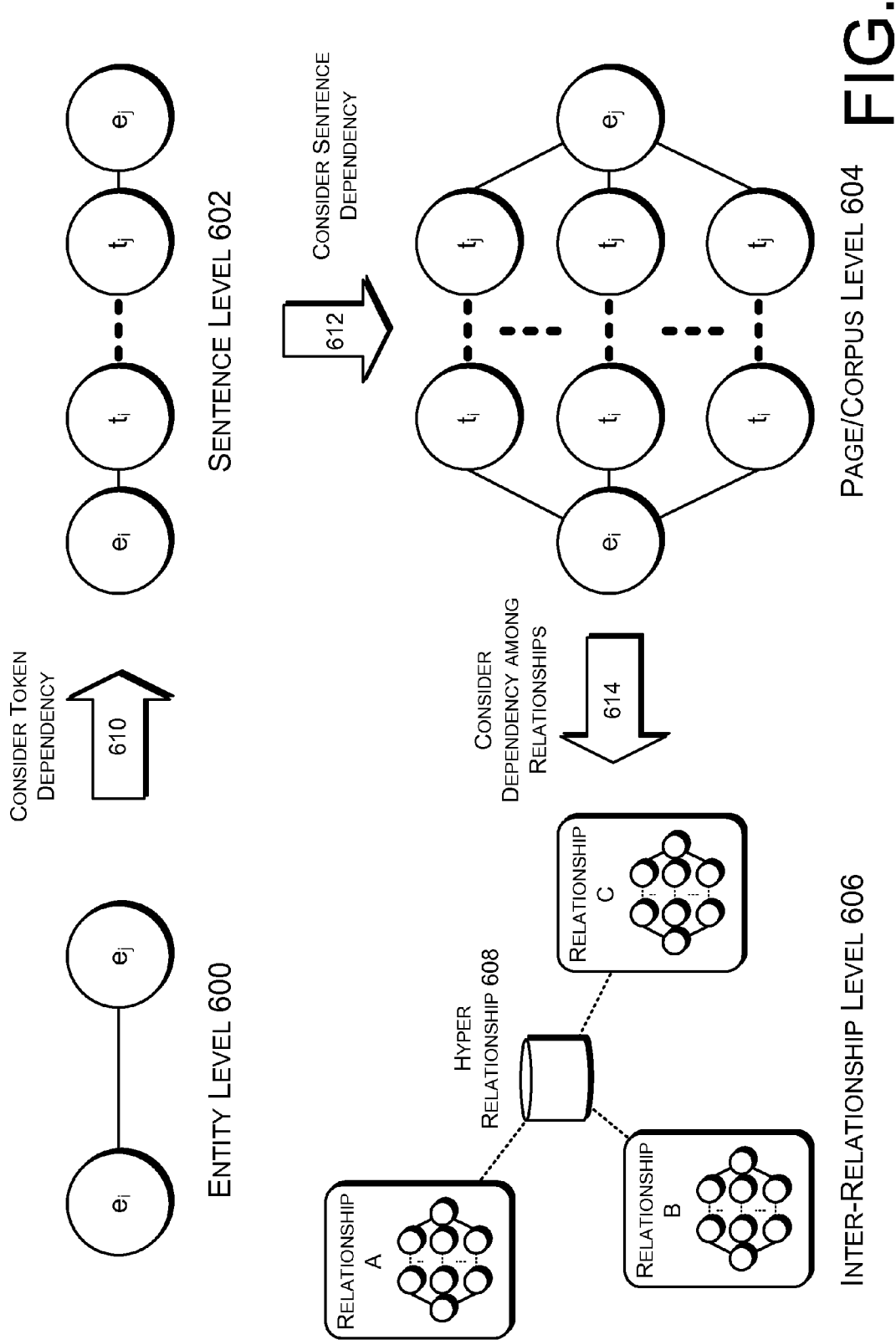
FIG. 6 is a block diagram of illustrative models for extraction based on intra- and inter-relationship dependency.

FIG. 6 is an illustrative block diagram illustrating models for relationship extraction based on intra- and inter-relationship dependency. By way of example, and not limitation, FIG. 6 includes three intra-relationship dependency levels, the entity-level 600, the sentence-level 602, and the page/corpus-level 604. Additionally, by way of example only, FIG. 6 also includes one inter-relationship level 606 which includes a hyper relationship 608 connecting several page/corpus-level relationships A, B, and C.

The entity-level extraction 600 may be the simplest extraction model and may have a strong independence assumption that determining whether two entities have a relationship is independent of other entities. Additionally, the entity-level extraction 600 may also be independent of relation keyword detection. Thus, by restricting all the formulae in MLN to include only query predicates that appear ONLY ONCE, the resultant MLN model may reduce to a logistic regression (LR) model, and the distribution in Eq. (2) may have the factorized form: $p(q|x) = \Pi_{ij} p(R(e_i, e_j)|x_{ij}) \Pi_t p(\text{InField}(t, f_t)|x_t)$, of which each component may be an exponential family distribution.

Considering token dependencies 610, the sentence-level extraction 602 treats a sentence as a whole input and may jointly detect whether a pair of entities (if any) in that sentence have some relationship, and whether the tokens around the entities indicate the relationship type. This may be possible, since in human languages, the words in sentences may not be independent of each other to express a specific meaning Thus, the independence assumption of the entity-level extraction model 600 may be too strong. By way of example, and not limitation, FIG. 6 shows entities that may be at the ends of a sentence, with the tokens in-between. In this example, the tokens may be classified as relational keywords by a linear-chain conditional random field (CRF).

As discussed above, in the sentence-level extraction model 602, entities and the tokens in the same sentence are not independent. Without context tokens, however, the sentence-level extraction model 602 may not be able to decide whether two entities in a sentence have some relationship. On the other hand, whether a token is a relation keyword may be dependent on its surrounding tokens. For example, for the sentence "Google forced to buy YouTube," which contains the entities "Google" and "YouTube," the verb "buy" may indicate an acquirement relationship between the two entities and the verb "forced" may not be a relation keyword because the following "buy" may be more likely to be a relation keyword. However, the LR model may not be able to consider this mutual dependence information. Thus, the sentence-level extraction model 602 may need to apply the linear-chain CRF. In this example, the MLN model may reduce to a linear-chain CRF by defining the following first-order formulae:

$$\text{InField}(t_i, \text{REL-S}) \char`\^ \text{Verb}(t_{i+1}) \Rightarrow \text{InField}(t_{i+1}, \text{REL-C}), \quad (3)$$

which may mean that when a token is the start of a relation (REL-S), then the following verb is more likely to be a continuation of the relation (REL-C).

Considering sentence dependencies 612, the page/corpus-level extraction 604 may jointly extract related sentences. This may be possible because the sentences in a webpage or a text document are not completely independent. Here, by way of example, and not limitation, joint inference may be applied to get globally consistent extraction results. As discussed above MLNs may have the full power to jointly model correlated data and, thus, sentence dependencies may be taken into account.

Finally, considering dependency among relationships 614, the inter-relationship level extraction 606 may connect second order relationships by way of hyper relationship 608. Hyper relationship 608 may be capable of identifying relationships between relationships, rather than between entities. By way of example, and not limitation, if separate sentences are identified—one stating that X is Y's "father," and the other stating that X is the "dad" of Y—during inter-relationship level extraction 606 the hyper relationship 608 may extract that there is a relationship between "father" and "dad." Thus, the hyper relationship 608 may identify the relationships between the "father" and the "dad" relationships.

FIGS. 3-6 provide simplified examples of suitable methods and systems for Web-scale entity relationship extraction. However, other configurations are also possible. For example, more or less modules may be present in the illustrative computing environment of FIG. 5. Additionally, the modules present may be configured to perform more or less functions than described. Further, while the extraction levels of FIG. 6 are shown with specific numbers of entities, tokens, and relationships, more or less entities, tokens, and relationships may be envisioned.

Illustrative methods and systems of Web-scale entity relationship extraction are described above. Some or all of these systems and methods may, but need not, be implemented at least partially by an architecture such as that shown in FIG. 5. It should be understood that certain acts in the methods need not be performed in the order described, may be rearranged, modified, and/or may be omitted entirely, depending on the circumstances. Also, any of the acts described above with respect to any method may be implemented by a processor or other computing device based on instructions stored on one or more computer-readable storage media.

Conclusion

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A computer-implemented method of incremental relation extraction, comprising:
   performed by one or more processors executing computer-readable instructions:
      receiving a relationship seed comprising relationship data and an initial model describing an entity relationship from an input device coupled to the one or more processors;
      learning a new model describing an additional entity relationship;
      extracting a relation tuple comprising additional relationship data from a data corpus by applying the newly learned model;
      generating one or more patterns based on the extracted relation tuple; and
      selecting at least one of the one or more patterns for learning an additional new model.

2. The computer-implemented method of claim 1 iteratively performing the learning, the extracting, the generating, and the selecting.

3. The computer-implemented method of claim 2 repeating the learning, the extracting, the generating, and the selecting until no new relation tuples are extracted.

4. The computer-implemented method of claim 2 wherein the learning comprises:
   learning the new model based on the relationship seed and the initial model during a first pass of the iterative process; and
   learning the new model based on the one or more selected patterns during all subsequent passes of the iterative process.

5. The computer-implemented method of claim 4 wherein the extracting comprises using a logistic regression model at an entity-level.

6. The computer-implemented method of claim 4 wherein the extracting comprises using a linear-chain conditional random field model at a sentence-level.

7. The computer-implemented method of claim 4 wherein the extracting comprises using a discriminative Markov logic network (MLN) model at a page-level, a corpus-level an entity-level, and/or a sentence-level.

8. The computer-implemented method of claim 4 wherein the initial model is empty.

9. The computer-implemented method of claim 4 wherein the initial model comprises a discriminative Markov logic network (MLN) model.

10. The computer-implemented method of claim 9 wherein the received relationship seed comprises identification of a first entity and a second entity found in the data corpus.

11. The computer-implemented method of claim 10 wherein the selecting further comprises keeping a formula with a non-zero weight of an $l_1$-norm regularized maximum likelihood estimation (MLE).

12. The computer-implemented method of claim 1 wherein the received relationship seed comprises identification of a first entity and a second entity found in the data corpus and one or more relation keywords.

13. The computer-implemented method of claim 1, further comprising:
   clustering the extracted relation tuples to connect same-type relation tuples; and
   outputting the clustered, connected relation tuples to an output device coupled to the one or more processors.

14. The computer implemented method of claim 1, further comprising performing open information extraction (Open IE) to identify new relationship types.

15. The computer-implemented method of claim 1 wherein the selecting comprises a structure learning problem of a Markov Logic Network (MLN) model.

16. One or more computer-readable storage devices, storing processor-executable instructions that, when executed by a processor, perform acts for incremental entity relationship extraction, the acts comprising:
   iteratively mining entity relations from a data corpus using a Markov Logic Network (MLN) model comprising:
      extracting entity information from the data corpus;
      extracting a relation tuple from the extracted entity information based on a maximum likelihood estimation (MLE); and generating one or more patterns based on the extracted relation tuple; and outputting a relationship graph based on extracted relation tuples, the relationship graph having at least two entities having at least two edges, the at least two edges connected to at least two different entities.

17. The one or more computer-readable storage devices of claim 16, wherein the entities comprise people, locations, and/or organizations.

18. The one or more computer-readable storage devices of claim 16, wherein the data corpus comprises web documents and/or web pages available through a global and/or public network.

19. A system for implementing entity relation extraction comprising:

memory and one or more processors;

an initial seed and/or model input module, stored in the memory and executable on at least one of the one or more processors, configured to receive a relationship seed and an initial model describing an entity relationship;

a model learning module, stored in the memory and executable on at least one of the one or more processors, configured to learn a new model describing an additional entity relationship based on input from the initial seed and/or model input module or based on a pattern from a pattern selection module;

a relation tuple extraction module, stored in the memory and executable on at least one of the one or more processors, configured to extract a relation tuple from a data corpus by applying the new model;

a pattern generation module, stored in the memory and executable on at least one of the one or more processors, configured to generate one or more patterns based on the extracted relation tuples; and the pattern selection module, stored in the memory and executable on at least one of the one or more processors, configured to assign a weight to the one or more patterns generated by the pattern generation module and select at least one of the one or more patterns based on the assigned weight to be iteratively input into the model learning module.

20. The system of claim 19, wherein the model learning module, the relation tuple extraction module, and the pattern selection module are configured to use a discriminative MLN model, the system further comprising:

a relationship clustering module, stored in the memory and executable on at least one of the one or more processors, configured to cluster the extracted relation tuples to connect same-type relation tuples; and an output module, stored in the memory and executable on at least one of the one or more processors, configured to output the clustered relation tuples.

* * * * *